United States Patent [19]

Johansson et al.

[11] Patent Number: 4,807,910
[45] Date of Patent: Feb. 28, 1989

[54] SLEEVE JOINT AND METHOD OF PRODUCING SUCH A SLEEVE JOINT

[75] Inventors: Göran Johansson, Örebro, Sweden; Dirk Arts, Oss, Netherlands

[73] Assignee: Oy Uponor AB, Nastola, Finland

[21] Appl. No.: 65,214

[22] PCT Filed: Oct. 16, 1986

[86] PCT No.: PCT/SE86/00481
§ 371 Date: Jun. 1, 1987
§ 102(e) Date: Jun. 1, 1987

[87] PCT Pub. No.: WO87/02753
PCT Pub. Date: May 7, 1987

[30] Foreign Application Priority Data

Oct. 22, 1985 [SE] Sweden ............................ 8504975

[51] Int. Cl.⁴ .............................................. F16L 13/02
[52] U.S. Cl. ........................................ 285/21; 285/53; 285/292
[58] Field of Search ................. 285/53, 21, 292, 291, 285/45

[56] References Cited

U.S. PATENT DOCUMENTS

| | | | |
|---|---|---|---|
| 1,577,090 | 3/1926 | Zander | 285/292 |
| 1,947,998 | 2/1934 | Mazza | 285/292 |
| 2,646,822 | 7/1953 | Ferguson | 285/292 X |
| 3,675,950 | 7/1972 | Beene | 285/45 |

FOREIGN PATENT DOCUMENTS 1423169  1/1976  United Kingdom ............ 285/53

Primary Examiner—Dave W. Arola
Attorney, Agent, or Firm—Armstrong, Nikaido Marmelstein & Kubovcik

[57] ABSTRACT

A sleeve joint for plastic-sheathed insulated pipes, comprising an oversized joint sleeve of plastic material overlapping the ends of the sheaths of connected pipes with a gap provided between the sleeve and said ends. Spacer means are located in the gap at either end. A circumferential groove is provided in the respective sheath outside of the gap. A fillet weld of a plastic material fills up the groove and the gap opening, and covers the sleeve end face.

16 Claims, 3 Drawing Sheets

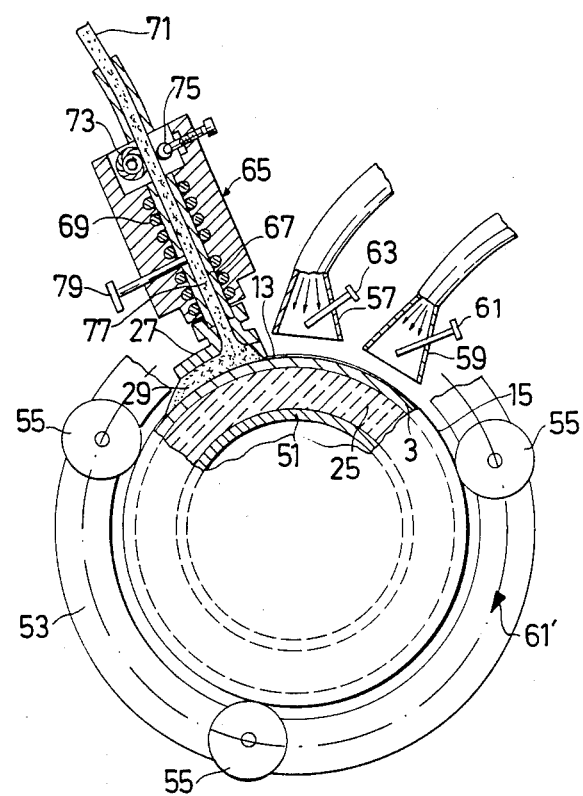

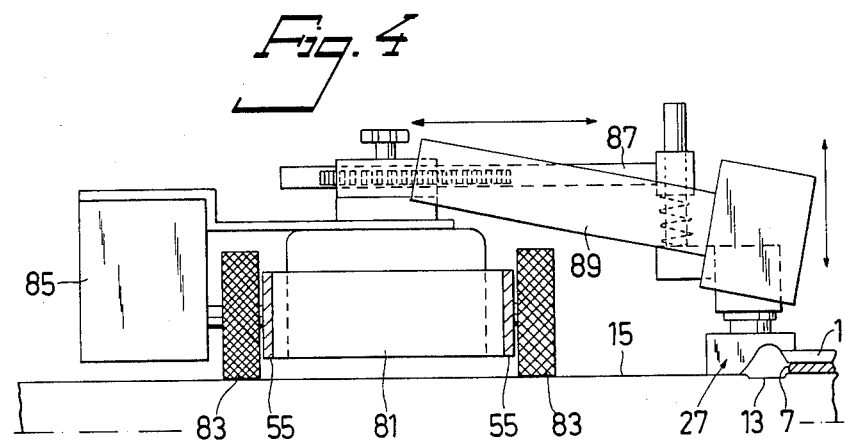
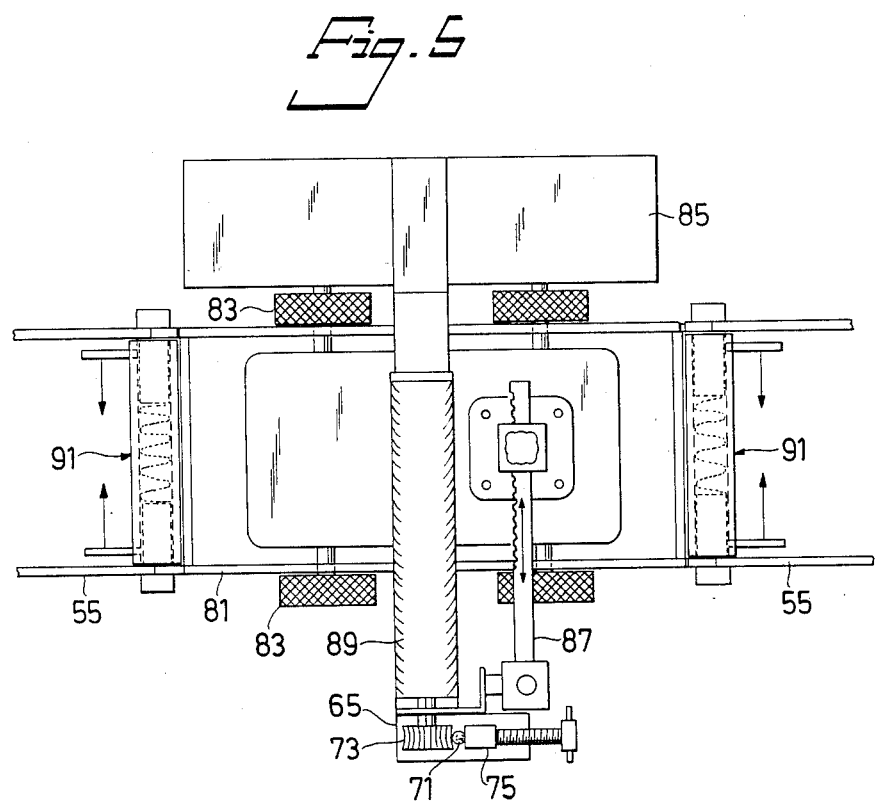

SLEEVE JOINT AND METHOD OF PRODUCING SUCH A SLEEVE JOINT

TECHNICAL FIELD

This invention relates to a sleeve joint for plastic-sheathed insulated pipes, particularly for a district heating system, said joint comprising a joint sleeve of plastic material covering the joint area and overlapping the ends of the sheaths of adjoining pipes that are connected to each other, the respective ends of the sleeve being secured and sealed to the overlapped pipe sheath by means of a fillet weld of plastic material, the pipe sheath and the sleeve and the weld preferably being of polyethylene.

The invention also relates to a method of producing such a sleeve joint.

BACKGROUND ART

Prefabricated plastic-sheathed pipes are commonly used in district heating systems. When a district heating pipeline is laid, prefabricated pipe lengths are connected to each other, whereafter the joint area is sealed so as to provide a permanent, insulated, watertight joint that can withstand the operating conditions and loads.

For small and medium diameter pipes, normally a standard sleeve joint is used for sealing the joint area. The sleeve bridges the two pipe sheath ends involved while overlapping said sheath ends. Mostly, the sleeve ends are sealed to the pipe sheaths by means of shrink-on gaiters.

However, when large diameter pipes and high mechanical stresses are involved, it has proved that the standard sleeve joint is not adequate, because the heat necessary for the shrinking process is difficult to apply in a proper way and the joints obtained have a tendency to crack and give leaks, thus leading to a damaged pipeline.

Instead, when large diameter pipes are involved, V butt welding of a joint sleeve has been used, the joint sleeve having the same outer diameter as the pipe sheath.

Also, a so-called "Swedish Joint" has been used. This is a sleeve joint wherein the overlapping sleeve ends are sealed to the underlying pipe sheath ends by means of intermediate heat welded material including electrical heating means and pressurizing means.

It has been proposed to seal the ends of the sleeve of a sleeve joint merely by melting together said ends and the outer layer of the adjoining pipe sheaths, the sleeve having an inner diameter corresponding to the outer diameter of the pipe sheath. The melting heat is supplied via a heating ring applied around the joint area. This method have proved not to be successful.

It has also been proposed, in general terms, that the sealing of the overlapping sleeve ends of a sleeve joint could be made by fillet welds, such welds then replacing the shrinkon gaiters. However, there have been no practical suggestions as to how the fillet welds should be made and no practical experiences of on-site use have been discussed.

OBJECTS OF THE INVENTION

One object of this invention is to provide an improved sleeve joint involving fillet welds which in particular can be used in connection with large dimensions pipes and where tough demands are to be met.

Another object of this invention is to provide a method of producing such an improved joint, the method being suitable for on-site use.

SUMMARY OF THE INVENTION

In accordance with the invention, these objects are achieved by the sleeve joint and the method for producing same having the features set forth in the accompanying claims.

Thus, according to a first important feature, the sleeve joint of the invention involves an over-sized sleeve such that the inner dimension of the overlapping sleeve is greater than the outer dimension of the overlapped pipe to thereby provide a well-defined annular gap therebetween. In order to center the pipe sheath and the sleeve relative each other, spacer means are provided in said gap at either end of the sleeve so as to keep each sleeve end portion and the overlapped pipe sheath at predetermined mutual distances relative to each other all the way around. In other words the gap distances will be entirely controlled.

In order to obtain a uniform and strong weld and joint, it has proved to be essential that the gap distances are constant and do not change during the welding process when the temperatures are high and the plastic materials involved are soft and easily deformable. Therefor, said spacer means should be made of a material such that said spacer means are dimensionally stable at the welding temperatures involved.

Also, the position of the spacer means in the gap has proved to be of importance. Thus, the spacer means should support the sleeve end close to the gap opening so as to prevent the heated sleeve end from sinking down towards the pipe sheath which would mean that the gap distances would change at the gap opening. However, it has also proved to be advantageous that the spacer means terminate somewhat inside of the gap opening defined by the lower or inner edge of the sleeve end face. This means that weld material can penetrate at least somewhat into the gap in front of the spacer means, thereby giving a better weld in that area.

Suitably said spacer means fill up the gap at least substantially all the way around. In other words, the gap should be at least substantially closed a small distance inside of the gap opening.

The spacer means preferably are made of wood or the like and can take the form of a flat strip which easily can be inserted laterally through the gap opening. Of course, the thickness of the strip will be equal to the desired gap distance. Mostly, the thickness will be constant.

The end of the spacer means facing the gap opening suitably should be rounded such that no sharp corners or edges will be present which could be starting points for cracks in the weld obtained.

According to another important feature of the invention, a circumferential groove is provided in the pipe sheath at least immediately outside of the gap at either end of the sleeve. Each fillet weld fills up the associated groove, as well as the adjoining gap opening area, and covers at least a major part of the associated sleeve end face, preferably the entire end face and also a marginal or border part of the adjoining sleeve outer surface. In the preferred case, the outer or upper part of the weld suitably has a generally convex section, followed by a sloping section having the general shape of a hillside terminating over the pipe sheath outside of the outer edge of the groove.

Preferably, the groove is cut just before the welding process or at least such that there will be no harmful oxidation of the groove bottom and walls prior to the welding.

However, the groove could be made in connection with the manufacture of the pipe, the groove then being provided with some kind of protection against oxidation, said protection being removed just prior to the welding process.

The groove has proved to give a substantial increase in the strength of the joint, in particular in combination with the weld-filled well-defined gap opening area.

It has been found suitable to have the inner edge of the groove located inside of the lower or inner edge of the sleeve end face but preferably outside of the outer end of the spacer means. Thus, generally speaking, the outer end of the spacer means, the inner edge of the groove and the lower edge of the sleeve end face all meet in the same sectional area.

However, it is envisaged that the groove could have a substantial extension into the gap and, in fact, could extend along the entire overlapped pipe sheath. Such a groove preferably could be made in connection with the manufacture of the pipe lengths. It will be recognized that such an extended groove would mean that the spacer means are located in the groove, enabling the use of a sleeve having less inner and outer dimensions.

The width of the groove outside of the gap suitably should be at least about the same as the thickness of the sleeve wall. The depth of the groove, as well as the gap distances, should be adapted to the sleeve thickness. However, the depth of the groove should not be less than about 0.5 mm, a typical depth being between about 2 and about 3 mm. The gap distance, or in other words the thickness of the spacer means, should not be less than about 2 mm, typically between about 3 and about 4 mm.

According to a further preferred feature of the invention, each end face of the sleeve is slanted downwards and inwards toward the gap. In other words, the end faces are undercut. This means a further improvement of the weld strength, particularly in the gap opening area. The shape of the sleeve end face is not critical. It can be generally planar, the angle between the end face and the sleeve outer surface typically being between about 60° to about 75°.

Preferably, the undercutting of the sleeve end faces is made just prior to the welding, that is, so as to prevent harmful oxidation of the end faces before the welding. However, the undercutting could be made at an earlier time, the cut face then suitably being provided with a removable protection so as to prevent oxidation. Of course, other cuttings could be envisaged if removal of oxidation is of primary interest.

It is to be understood that circular configurations of the pipes and the sleeves are most common. In these cases, "inner dimension" means "inner diameter" and "outer dimension" means "outer diameter". However, other configurations are possible, such as oval configurations in connection with pipelines having two pipes within one and the same sheath. In such a case, the spacer means become still more essential in order to control the gap distance during heating and welding.

The welding preferably is an extrusion process, as will be explained more closely in the following.

The invention also comprises a method of producing a sleeve joint of the kind discussed above, the method comprising applying a joint sleeve of plastic material to cover the joint area such that the sleeve overlaps the ends of the plastic sheaths of adjoining pipes that are connected to each other, and securing and sealing the sleeve ends to the associated overlapped pipe sheaths by welding plastic material to form a fillet weld at each one of the end faces of the sleeve. The essential features according to the invention are:

(a) applying an over-sized sleeve such that the inner diameter thereof is greater than the outer diameter of the associated overlapped pipe sheath to provide a well-defined gap therebetween.

(b) applying heat-resistive spacer means in said gap at the two circumferential openings thereof such that predetermined gap distances between the sleeve and the pipe sheath are maintained at the ends of the sleeve during the later welding of the fillet welds, (c) cutting a circumferential groove in each of the two pipe sheaths involved such that the grooves will be located at least immediatey outside of said gap openings when the sleeve is properly applied, (d) heating the weld area, and (e) providing fillet welds by extruding molten weld material on the heated weld area such that the weld material penetrates into and fills up the associated groove and gap opening and covers at least a major part of the associated end face of the sleeve, preferably such that each weld covers the entire associated sleeve end face as well as the associated outer border surface area of the sleeve and the border surface area of the pipe sheath adjacent the groove.

With regard to step (a), it will be realized that the use of an oversize sleeve mostly means that the handling of the sleeve will be facilitated, because the sleeve can be pushed over and along a pipe sheath without any problems. Of course, this means that a continuous or unslotted sleeve can be used, although the invention also can be used together with a slotted sleeve, the slot being welded together after the welding of the sleeve ends.

With regard to step (b), it is preferred to apply the spacer means in the form of a flat strip of a heat-resistive material, such as wood, the strip having a thickness corresponding to a predetermined gap distance and a length corresponding to the circumferential gap length, whereby the strip can be pushed into the gap through the gap opening to close the gap. In other words, the spacer means need not be in the form of a ring and, consequently, need not be pushed onto the pipe section before the connection thereof to another pipe section.

With regard to step (c), the cutting can be made by means of any suitable tool, such as a cutter. As previously indicated, the cutting advantageously should be made close to the welding process, because then there will be no adverse effects caused by oxidation of the surfaces of the groove.

With regard to step (d), it has been found advantageous to provide the heating by blowing hot air against the weld area. Such heating can be easily accomplished on-site and in a controlled way by means of conventional hot air blowers. The temperature of the air, typically about 200°–250° C. when the pipe sheaths and the sleeve are made of polyethylene, should be controlled such that the weld area, that is, the groove and the sleeve end face and the adjoining areas, will be heated to their welding or melting temperature, not only at the surfaces but to a certain depth, typically about some millimeters. This also means that any sharp corners and edges automatically will be rounded, thus minimizing the risks of the stress concentration and cracks.

Since it is thus essential to have uniform and controlled temperature conditions before carrying out the welding process and since this is an on-site method involving all kinds of weather conditions, it has been found advantageous to preheat the weld area, prior to the final heating discussed above. Such preheating compensates for various weather differences and makes the final heating more accurate. Preferably, the preheating also is provided by blowing heated air over the weld area. It has been found suitable to preheat to a temperature about but below the melting temperature of the weld material. Typically, the temperature of the preheating air could be about 100° C., the melting temperature of the weld material typically being about 120° C.

It should be pointed to that the blowing of hot air easily can be controlled while using adjustable nozzles.

With regard to step (e), it is preferred to extrude molten weld material within a movable weld shoe sliding both on the upper surface of the sleeve and on the surface of the sheath outside of the associated groove, the weld shoe having an inner weld space defining the outer profile of the extruded weld. The weld shoe together with appropriate equipment for supplying the weld material and appropriate heating means can be moved as an aggregate along the weld area all the way around, as will be made more clear in connection with the description of an exemplifying apparatus for carrying out the method of the invention.

The use of a sliding weld shoe as stated above means that the shoe can be designed such that the forward end thereof engages the border surface areas of the sleeve and the pipe sheath outside of the groove in such a way that heated, softened surface layers are removed, thus removing any harmful oxidations and enabling a better binding between the sleeve and sheath materials and the extruded weld material applied thereon within the welding shoe.

As previously indicated, according to a further preferred feature of the invention, the method involves a cutting or machining of the sleeve end faces giving a favourable undercutting and/or a removal of any harmful oxidation. Such a cutting easily can be made by means of a hand-held tool just prior to the welding.

The invention will now be described further by an examplifying embodiment while referring to the enclosed drawings.

BRIEF DESCRIPTIONS OF THE DRAWINGS

FIG. 3 is a schematic cross-sectional view illustrating extrusion welding in accordance with the invention for providing a fillet weld.

FIG. 4 is a schematic side view illustrating basic features of an apparatus for carrying to the method according to this invention.

FIG. 5 is a schematic view from above of the apparatus of FIG. 4.

DESCRIPTION OF EMBODIMENT

Figure 1:
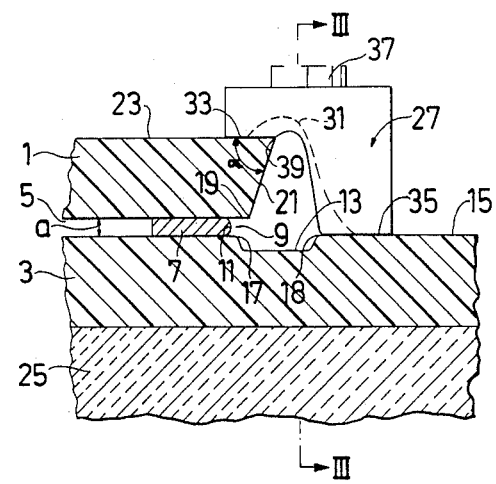
FIG. 1 is a schematic partial longitudinal sectional view of a sleeve joint in accordance with the invention, the view also showing the general application of a welding shoe.
Figure 2:
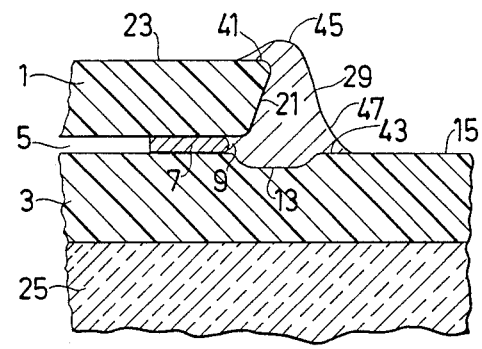
FIG. 2 is a view as in FIG. 1 showing the fillet weld obtained in accordance with the invention.

In FIGS. 1 and 2, an over-sized tubular sleeve 1 overlaps a tubular pipe sheath 3 such that there is an annular gap 5 therebetween. A flat spacer strip 7 of solid wood is located close to but inside of the gap opening 9. The thickness of strip 7 is constant and equal to the gap distance a. The outer end 11 of strip 7 is rounded. Strip 7 is continuous and extends all the way around to form a spacer ring. Thus, gap 5 is circumferentially closed a short distance inside of the proper gap opening. It will be understood that strip 7 easily can be inserted into gap 5 by being pushed laterally into gap 5 through gap opening 9.

A circumferential groove 13 is cut in the outer surface 15 of pipe sheath 3 just outside of gap opening 9. The width of groove 13 is about the same as the thickness of the sleeve wall. The inner edge 17 of groove 13 is located inside of the lower edge 19 of the sleeve end face 21 but outside of strip end 11. Sleeve end face 21 is flat and slanted downwards and inwards, the angle α between end face 21 and the outer surface 23 of sleeve 1 being about 70°–75°.

Pipe sheath 3 and sleeve 1 are made of polyethylene, while the underlying insulation 25 is made of polyurethane.

FIG. 1 shows the situation prior to heating and welding. However, the typical position of a weld shoe 27 is shown which is used for the extrusion of a fillet weld 29 (FIG. 2). FIG. 1 shows the forward end of the weld shoe, the inner configuration of the shoe being generally indicated by broken lines 31. Shoe 27 is adapted to slide both on sleeve surface 23 and on pipe sheath 15 so as to define the outline of weld 29 therebetween. The forward "upper" edge 33 and the forward "lower" edge 35 of shoe 27 are designed so as to have a scraping effect on the underlying surface 23 and 15, respectively, to thereby remove a thin outer surface layer that could be oxidated and prevent a good weld. As will be understood, the cutting of groove 13 and end face 21 preferably should be made such that there will be no harmful oxidation when the welding takes place.

Prior to the welding, that is, prior to supplying molten polyethylene weld material through an upper opening 37 of shoe 27, the weld area is heated, as will be described later. Due to this heating all sharp corners or edges of sleeve 1 and sheath 3 in the weld area will be rounded by melting. Such edges include edges 17 and 19 and the outer edge 39 of sleeve end face 21 and the outer edge 18 of groove 13. Since the outer end 11 of strip 7 also is rounded, this means that the entire weld 29 will be free from places where stress concentrations could develop and give cracks, as should be clear from FIG. 2.

With regard to the weld 29 obtained (FIG. 2), the weld material penetrates into and fills up groove 13 and gap opening 9 which together with the abovementioned "rounding" has proved to give a very strong weld, in particular with regard to the weld root area. The weld material covers the entire end face 21, as well as the border area 41 of the sleeve outer surface 23 and the border area 43 of pipe sheath surface 15 outside of groove 13. In section, the upper or outer part 45 of the weld is convex, while the lower or inner part 47 is sloped in a hillside-like manner.

FIG. 3 illustrates the basic preferred features of the heating and welding in accordance with the invention. FIG. 3 may be considered a cross-sectional view generally taken along lines III—III in FIG. 1, certain apparatus elements being added.

In accordance with FIG. 3, the heating and welding is carried out automatically by means of an apparatus rotating around the pipeline, the pipeline having an inner steel pipe 51, insulation 25 and outer sheath 3. Of course, before the heating and welding, groove 13 and slanted end face 21 have been cut and sleeve 1 and strip 7 have been properly located.

The apparatus comprises a ring frame 53 surrounding the pipeline and having wheels 55 rotating on the outer surface 15 of sheath 3. At least one wheel 55 is driven for causing ring frame 53 to rotate around the pipeline. Of course, ring frame 53 can be opened such that it can be located around the pipeline and removed therefrom when necessary.

A weld car (not shown in FIG. 3) is supported by and rotates with ring frame 55. The weld car carries the extrusion welding equipment including the weld shoe 27. Heating means in the form of a first hot air blower 57 and preheating means in the form of a second hot air blower 59 are also carried by the weld car or, alternatively, directly on the ring frame 53 (not shown). The direction of rotation is indicated by arrow 61'.

Thus, firstly the weld area will be preheated by blower 59, the air temperature being measured by a temperature transducer 61 and controlled according to predetermined conditions.

Secondly, the weld area will be heated by blower 57, the air temperature thereof also being measured by a transducer 63 and controlled according to predetermined conditions.

As will be understood, the locations of blowers 57 and 59 easily can be adjusted so as to give the desired heating effects. The nozzles of the blowers suitably are elongated and in register with the weld area and groove 13. In this respect, it should be noted that groove 13 will give a favourable channelling effect with regard to the air flow.

Thirdly, the weld area will be supplied with molten weld material through weld shoe 27, the resulting extruded fillet weld passing out of the rear end of shoe 27.

The equipment for supplying molten weld material includes a container 65 having a melting chamber 67 surrounded by heating element 69. Weld material is forced into chamber 67 in the form of a flexible solid rod 71 of weld material. The feeding mechanism for said rod 71 includes a driven feed roller 73 and a co-operating pressure roller 75. The temperature of the molten material 77 is controlled by means of a temperature transducer 79. As will be understood, the molten material is pushed from chamber 67 into the inner of weld shoe 27. Suitably, the feeding of molten material is adjusted, while considering the other extrusion conditions, such that the molten material within the shoe will be pressurized and thereby penetrate into all weld area spaces.

Since the apparatus is to be rotated around a pipeline on-site, that is, in a trench for instance, all elements involved should project from the pipeline as little as possible. Although this is not essential for the invention. FIGS. 4 and 5 show one example of a low design of a weld car. In addition to elements and components previously discussed, these figures show the following: Weld car frame 81; drive wheels 83; drive wheel motor 85; adjustable support arm 87 for weld material supply; feed roller motor 89; and ring frame opening mechanism 91.

Since the operation of this apparatus, as well as necessary power supply etc, will be obvious to those skilled in the art, no description thereof should be necessary.

Figure 6:
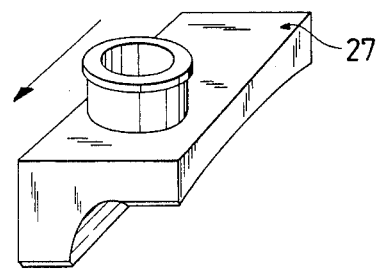
FIG. 6 is is a schematic perspective view of a welding shoe used in accordance with the invention.

FIG. 6 finally is a schematic perspective view of an example of a weld shoe to be used in connection with the invention. The shoe suitably is made or modelled of a heat insulating material so as not to disturb the temperature conditions of the extruded weld by a premature cooling. Also, the material of the shoe should not adhere to the weld material. A suitable weld shoe material is Teflon ® or the like. As will be understood, the various curvatures of the shoe should be adapted to the weld outline and pipe diameter etc.

The invention is not to be restricted to the embodiments shown and discussed, but changes and modifications may be made within the scope of the appended claims.

We claim:

1. A sleeve joint for joining a plastic sleeve with a plastic sheath of a plastic-sheathed insulated pipe, comprising:
   a pipe sheath having a circumferential groove;
   a sleeve having an end overlapping said pipe sheath with said end having an end face, said overlapping end having an inner dimension greater than an outer dimension of said pipe sheath providing a gap therebetween and a gap opening at the end of said sleeve, said sleeve is positioned on said sheath so that said circumferential groove is located outside of said gap at approximately the end of said sleeve;
   spacer means provided in said gap at the end of said sleeve for maintaining said sheath centered within the end of said sleeve, said spacer means is made of a material that is dimensionally stable at welding temperature during formation of the joint, said spacer means substantially filling the gap circumferentially at said gap opening; and
   a fillet weld of plastic material substantially filling said groove and said gap opening, and covering at least a major portion of said end face of said sleeve.

2. A sleeve joint as claimed in claim 1, characterized in that said end face of the sleeve is slanted downwards and inwards toward the gap.

3. A sleeve joint as claimed in claim 2, characterized in that said spacer means terminates inside of an inner edge of the end face of the sleeve and inside of an inner edge of the groove, located approximately in register with said inner edge of the end face of the sleeve.

4. A sleeve joint as claimed in claim 2, characterized in that a lower edge of the end face of the sleeve, an inner edge of the groove and an outer end of said spacer means generally meet in the same sectional area.

5. A sleeve joint as claimed in claim 2, characterized in that the groove has a width outside of the gap that is at least about the same as the thickness of the sleeve wall.

6. A sleeve joint as claimed in claim 1, characterized in that said spacer means terminate inside of an inner edge of the end face of the sleeve and inside of an inner edge of the groove, located approximately in register with said inner edge of the end face of the sleeve.

7. A sleeve joint as claimed in claim 6, characterized in that a lower edge of the end face of the sleeve, an inner edge of the groove and an outer end of said spacer means generally meet in the same sectional area.

8. A sleeve joint as claimed in claim 6, characterized in that the groove has a width outside of the gap that is at least about the same as the thickness of the sleeve wall.

9. A sleeve joint as claimed in claim 1, characterized in that a lower edge of the end face of the sleeve, an inner edge of the groove and an outer end of said spacer means generally meet in the same sectional area.

10. A sleeve joint as claimed in claim 9, characterized in that the groove has a width outside of the gap that is at least about the same as the thickness of the sleeve wall.

11. A sleeve joint as claimed in claim 1, characterized in that the groove has a width outside of the gap that is at least about the same as the thickness of the sleeve wall.

12. A sleeve joint as claimed in claim 1, characterized in that the weld covers the entire associated end face of the sleeve and also an adjacent part of the outer surface of the sleeve.

13. A sleeve joint as claimed in claim 12, characterized in that the upper outer part of the weld has a generally convex section.

14. A sleeve joint as claimed in claim 1, characterized in that, in section, the outer end of said spacer means is rounded.

15. A sleeve joint as claimed in claim 1, characterized in that said spacer means are made of wood and preferably has the form of a flat strip.

16. A sleeve joint as claimed in claim 1, characterized in that said spacer means terminate inside of an inner edge of the end face of the sleeve and inside of an inner edge of the groove, located approximately inside of said inner edge of the end face of the sleeve.

* * * * *